Sept. 15, 1942.　　　　　B. J. CLARK　　　　　2,295,714
WATER TREATING APPARATUS
Filed April 19, 1939
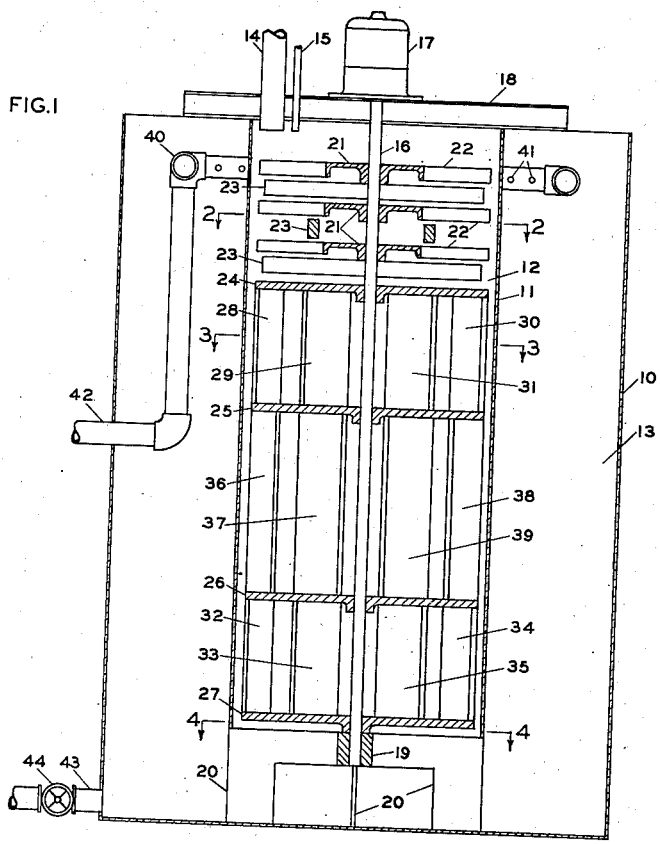
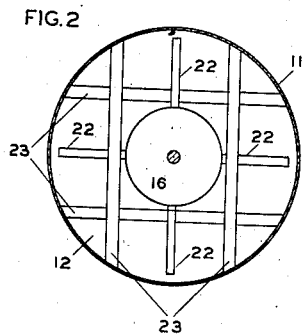
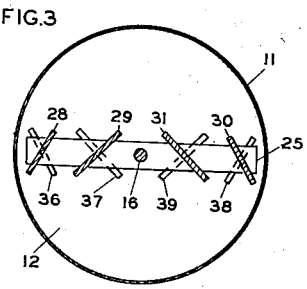
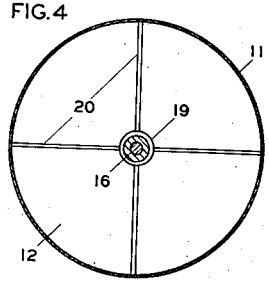
INVENTOR.
BRADFORD J. CLARK
BY
ATTORNEY.

Patented Sept. 15, 1942

2,295,714

UNITED STATES PATENT OFFICE 2,295,714

WATER TREATING APPARATUS

Bradford J. Clark, New York, N. Y., assignor to The Permutit Company, New York, N. Y., a corporation of Delaware Application April 19, 1939, Serial No. 268,725

5 Claims. (Cl. 210—16)

This invention relates to water treating apparatus; and it comprises a flocculation chamber, inlets for water and floc-forming or precipitating reagent near one end of the chamber, means for establishing communication between the opposite end of the chamber and a settling compartment, a shaft in the chamber, means for rotating the shaft, mixing arms mounted on the shaft in several planes adjacent the inlet end of the chamber, stationary baffles in the chamber intermediate the mixing arms, the spacing between adjacent planes of arms and baffles being sufficiently close to produce strong eddies upon rotation of the shaft for thorough mixing of water and reagent, means being advantageously provided to prevent a flow parallel with and in close proximity to the shaft, and paddles mounted on the shaft near the outlet end of the chamber and being adapted to impart to the water and reagent mixture a gentle agitation movement; all as more fully hereinafter set forth and as claimed.

In water treatment by chemical methods lime, soda, alum, iron salts, etc., are added to water to form a precipitate or floc. Best treatment results are obtained by first thoroughly mixing the water and chemical for a relatively short period of time and subsequently gently agitating the mixture for a longer period of time. In doing this, separate agitators and drives have been used in the past, the first or mixing agitator being operated at a high speed in order to accomplish rapid and complete mixing of water and chemical, and the second agitator being operated at maximum peripheral speeds in the order of but two feet per second so as to impart to the water a gentle motion, sufficient to greatly accelerate and improve the formation of floc or precipitate but insufficient to cause any redispersion of floc or precipitate already formed.

The objects of my invention are to provide in a water treating apparatus improved means for first thoroughly mixing water and chemical and then gently agitating the mixture, using but one agitator shaft and single means to drive the shaft, and also to provide novel and improved means for thoroughly mixing water and chemical at relatively low speed.

I attain these objects by apparatus illustrated in the accompanying drawing, in which—

Fig. 1 is an elevation, partly in section, of a water treating apparatus in accordance with my invention; and Figs. 2, 3 and 4 are horizontal sections along lines 2—2, 3—3, and 4—4, respectively, of Fig. 1.

Similar reference numerals refer to similar parts throughout the several views.

As shown in Fig. 1, the apparatus comprises a tank 10 within which is located a shell 11, defining a flocculating chamber 12 within the shell 11 and a settling chamber 13 between the shell 11 and the outside wall of tank 10. An inlet 14 for water and another inlet 15 for chemical reagent solution lead into the top of chamber 12.

Within chamber 12 is a vertical shaft 16 which is rotatable by an electric motor 17 with integral gear reduction. The motor is mounted on beams 18 on top of the tank. The lower end of shaft 16 is guided in bearing 19. A set of baffles 20 supports the bearing 19 as well as the shell 11.

In the upper portion of chamber 12 the shaft carries several vertically spaced discs 21 of approximately half as great a diameter as that of chamber 12. Each of the discs is provided with four radially extending mixing arms 22. Intermediate the planes of arms 22 are stationary baffles 23 eccentrically mounted in shell 11 (see Fig. 2). The vertical spacing between adjacent planes of arms 22 and baffles 23 is advantageously such that the clearance amounts to about 50 per cent of the total cross sectional area or less.

In the lower portion of chamber 12 the shaft 16 carries cross members 24, 25, 26 and 27. Between cross members 24 and 25 and on one side of shaft 16 are mounted paddles 28 and 29 so as to form oblique angles with the cross members; on the other side of shaft 16 paddles 30 and 31 are mounted so as to form with the cross members oblique angles which are inclined in the opposite direction. Between cross members 26 and 27 paddles 32, 33, 34 and 35 are mounted analogously to paddles 28 to 31. Between cross members 25 and 26 are mounted paddles 36 to 39 of approximately double the length of and inclined in the opposite direction to paddles 28 to 35 (see Fig. 3). Upon rotation of the shaft each tier of paddles sets up a gentle rotating movement of water across a diameter of the tank. The resulting reaction forces are balanced by the opposite inclination of the second tier to that of the first and third tier so that no unbalanced side thrust acts on the shaft. This type of slow speed agitator is specifically claimed in Patent 2,179,271 to Eric Pick, dated November 7, 1939.

Near the top of chamber 13 is a draw-off pipe 40 with perforations 41 to collect the settled water and discharge it through an outlet 42. A pipe 43 with valve 44 near the bottom of tank 10 is arranged to permit withdrawal of settled matter or draining the entire apparatus.

In operation the motor 17 rotates the shaft 16 at a speed to result in a peripheral speed at the agitator tips of from about 1 to about 3 feet per second, the exact speed best suited to the character of the water being treated advantageously being determined in each case.

Water and chemical entering through inlets 14 and 15 are first thoroughly mixed by the action of arms 22. As these arms pass in close proximity to baffles 23 strong eddy currents are set up. The liquid is squeezed through the narrow clearances and thus complete mixing is readily obtained. The horizontal discs prevent any liquid from flowing downward in close proximity to the shaft where the rotational speed is too low for good mixing. The agitation in the mixing zone is sufficiently violent to cause, if prolonged, a re-dispersion of the precipitate or floc formed upon completion of mixing, and the duration of this mixing step is, therefore, limited to some minutes by suitable adaptation of the volume of the mixing zone to the rate of flow through the apparatus.

From the mixing zone the mixture passes into the zone of paddles 28 to 39 where it is gently agitated to form a strong, easily settleable floc or precipitate. As the mixture then flows past baffles 20 any rotational motion is stilled. During its upward travel through compartment 13 most of the formed floc or precipitate is settled out, and treated and relatively clear water flows through perforations 41 to outlet 42. The effluent may be further clarified by filtration.

The apparatus in accordance with my invention combines a compact and highly efficient arrangement with a simple and inexpensive double purpose agitating device, one shaft and one drive doing the work formerly requiring two shafts and two drives operating at different speeds.

While I have shown and described a specific embodiment of my invention, modifications will readily occur to those skilled in the art without departing from the spirit of my invention, and reference is made to the following claims for a definition of the scope of my invention.

What I claim is:

1. In water treating apparatus for continuous flocculation comprising a flocculation chamber, a settling chamber, inlets for water and chemical at one end of the flocculation chamber, an outlet for the opposite end of the flocculation chamber communicating with one end of the settling chamber, and an outlet for the other end of the settling chamber, an improved agitating device which comprises a shaft within the flocculation chamber, means rigidly connected with said shaft for rotation thereby and comprising a plurality of parallel discs for preventing a flow of water parallel with and in close proximity to the shaft and radially extending mixing arms adjacent said discs, stationary baffles mounted in the flocculation chamber in a plurality of planes intermediate the planes in which the mixing arms are arranged, and means for rotating said shaft.

2. In water treating apparatus for continuous flocculation comprising a flocculation chamber, a settling chamber, inlets for water and chemical at one end of the flocculation chamber, an outlet for the opposite end of the flocculation chamber communicating with one end of the settling chamber, and an outlet for the other end of the settling chamber, an improved agitating device which comprises a shaft within the flocculation chamber, means rigidly connected with said shaft for rotation thereby and comprising a plurality of disc shaped members and radially extending mixing arms mounted in a plurality of planes adjacent the inlet end of the flocculation chamber, stationary baffles mounted in the flocculation chamber in a plurality of planes intermediate the planes in which the mixing arms are mounted, the spacing between adjacent planes of arms and baffles being sufficiently close to produce strong eddies upon rotation of the shaft, agitator paddles mounted on said shaft adjacent the outlet end of the flocculation chamber, and means for rotating said shaft.

3. In water treating apparatus for continuous flocculation comprising a flocculation chamber, a settling chamber, inlets for water and chemical at one end of the flocculation chamber, an outlet for the opposite end of the flocculation chamber communicating with the settling chamber, and an outlet for the settling chamber, an improved agitating device which comprises a vertical shaft within the flocculation chamber, a plurality of disc shaped members mounted on said shaft adjacent the inlet end of the flocculation chamber, horizontally extending mixing arms mounted on said disc shaped members, horizontally extending stationary baffles mounted in the flocculation chamber intermediate said arms, the vertical spacing between adjacent arms and baffles being sufficiently close to produce strong eddies upon rotation of the shaft, agitator paddles mounted on said shaft adjacent the outlet end of the flocculation chamber, and means for rotating said shaft.

4. In water treating apparatus for continuous flocculation comprising a cylindrical flocculation chamber, a settling chamber, inlets for water and chemical at one end of the flocculation chamber, an outlet for the opposite end of the flocculation chamber communicating with the settling chamber, and an outlet for the settling chamber, an improved agitating device which comprises a vertical shaft central in the flocculation chamber, a plurality of horizontally extending disc shaped members mounted on said shaft at different elevations adjacent the inlet end of the flocculation chamber, a plurality of mixing arms extending horizontally from each of said disc shaped members, stationary horizontally extending baffles eccentrically mounted in the flocculation chamber at elevations intermediate the elevations at which the disc shaped members and arms are mounted, the vertical spacing between arms and baffles being sufficiently close to produce strong eddies upon rotation of the shaft, agitator paddles mounted on said shaft adjacent the outlet end of the flocculation chamber, and means for rotating said shaft.

5. In water treating apparatus for continuous flocculation comprising a vertical cylindrical flocculation chamber, a settling chamber, inlets for water and chemical at the top of the flocculation chamber, means establishing communication between the lower end of the flocculation chamber and the lower end of the settling chamber, and an outlet for the other end of the settling chamber, an improved agitating device which comprises a vertical shaft central in the flocculation chamber, means for rotating said shaft at a predetermined speed, a plurality of horizontal arms rigidly connected with said shaft in the top portion of the flocculation chamber in several vertically spaced planes, stationary baffles mounted in the flocculation chamber intermediate the planes in which the arms are mounted, the spacing between adjacent planes of arms and baffles being sufficiently close so that at said predetermined rotational speed eddies are produced which are sufficiently strong to cause thorough mixing of water and chemical and which in prolonged time would cause dispersion of floc formed by reaction between water and chemical, and a plurality of agitator paddles mounted on said shaft in the bottom portion of the flocculation chamber, said agitator paddles being spaced to provide wide passages for the water so that at said predetermined rotational speed of the shaft they produce a gentle movement of the water which is insufficient to even if prolonged to cause dispersion of floc formed by reaction between water and chemical, the bottom portion of the flocculation chamber occupied by the agitator paddles being substantially greater than the top portion of the flocculation chamber occupied by the arms and baffles.

BRADFORD J. CLARK.